Nov. 1, 1966        M. O. WEIG        3,282,210
CERTIFIED CHECK CODED FOR REJECTION IN SORTING MACHINE
Filed April 10, 1963

INVENTOR.
Morris O. Weig
BY
ATTORNEY.

United States Patent Office

3,282,210
Patented Nov. 1, 1966

3,282,210
CERTIFIED CHECK CODED FOR REJECTION IN SORTING MACHINE
Morris O. Weig, 68 Lloyd Ave., Lynbrook, N.Y.
Filed Apr. 10, 1963, Ser. No. 272,105
1 Claim. (Cl. 101—426)

This invention relates to magnetic coding of checks for processing in automatic check sorting machinery as used in banks and banking institutions.

When a check is certified at a bank the amount of the check is first deducted from the deposit account of the drawer or payer of the check. After the check has been deposited in his own account by the payee, and the check has cleared through a clearing house, the check is returned to the certifying bank. The certifying bank in the ordinary course of business processes the check through its automatic electronic sorting and accounting machines if the check is one of the type having magnetically coded areas. At present, the bank clerk at the certifying bank marks the certification on the face of the check and in a separate operation marks the magnetic ink area. This leaves room for a miscarriage and inadvertently omission of the marks on the magnetic ink area. If the magnetic ink area is inadvertently not marked, it is possible that the amount of the check will be deducted a second time from the drawer's account. This double deduction could cause much confusion and embarrassment to the bank and to the bank's customers.

It is one object of the present invention to provide a means for coding a bank check which will result in rejection of the check by the electronic processing machines at a bank.

It is a further object to provide a method for preventing double deductions of the amount of a certified check from a bank customer's account.

It is another object to provide a simultaneous coding of a bank check with a certification marking and magnetic rejection code.

According to the invention, the certifying clerk at a bank applies heavy magnetic spots, symbols, or perforation at a certain coding area on a check at the same time that the check is certified and the amount of the check is deducted from the drawer's account. These magnetic spots result in rejection of the check by the bank's electronic sorting and accounting machines when the check is returned from a clearing house, so that the amount of the check is not deducted twice from the drawer's account.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
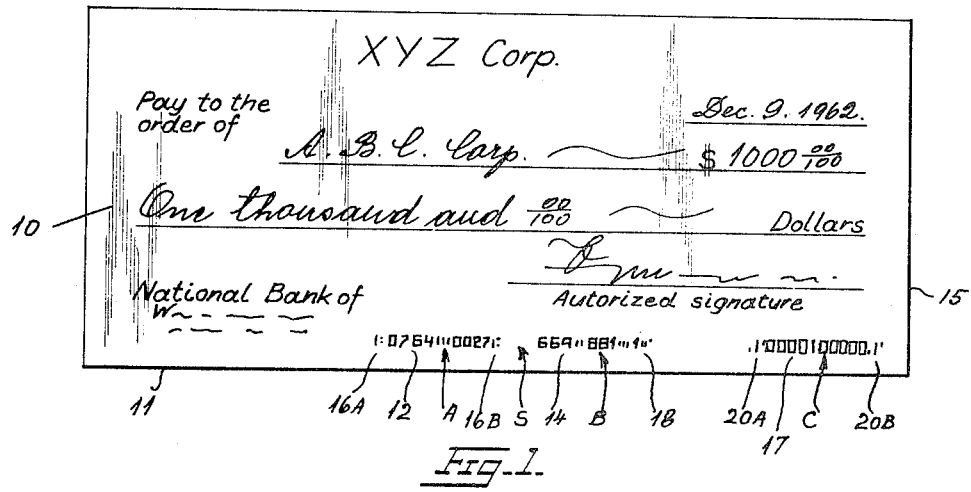
FIG. 1 is a plan view of a bank check prior to certification.

Referring to FIG. 1, there is shown a check 10 which is a rectangular piece of bank check paper. Adjacent to the lower edge 11 of the face of the check is a plurality of groups of magnetic ink characters of the kind used in a mechanized check sorting system. One of these groups is identified by the reference character A and includes indicia such as numbers 12 identifying a particular bank upon which the check is drawn. Adjacent to group A is a second group B, which has indicia such as code numbers 14 identifying the particular account against which the check is drawn. A third group C which appears to the right of group B and has indicia 17 representing dollars the amount of the check being certified.

The groups of indicia such as numbers are so located on the face of the check 10 as to lie substantially at the center of a band extening 5/8 inch from the bottom edge 11 of the check towards its opposite top edge and all groups of indicia such as numbers are precisely located a predetermined distance from the right-hand end edge 15 of the check. All of the characters of group A must be located between two symbols 16A, 16B which define a field known as the "transit number" field. All of the characters of group B are located in a field referred to as the "on us" field and which is defined at its right-hand boundary by the symbol 18. All of the characters to appear in space C are located within a field designated the "amount" field and bounded by symbols 20A, 20B. All the field boundaries are precisely located a predetermined distance from the right-hand end edge 15; for example, the right and left boundaries of the "amount" field are located 1 7/8 inches and 1/4 inch respectively from the right-hand end edge 15.

All of the characters in fields A, B and C must have a nominal height of 0.117 inch and should be located on the 5/8 inch wide strip in a band 1/4 inch high with its lower edge no less than 3/16 inch from the bottom edge 11 of the check 10. These dimensions are important because if the characters of the groups extend above the top edge of the 1/4 inch band, or below the bottom edge of this band, the magnetic scanning mechanism of the automatic machinery will not be capable of handling the check accurately and the check will automatically be rejected by the machinery for personal handling by an attendant clerk.

All of the coded indicia or numbers in the areas A and B as well as the several boundary symbols are preprinted on the face of the check in special magnetic ink to which the electronic circuits of the sorting machinery are responsive.

Figure 2:
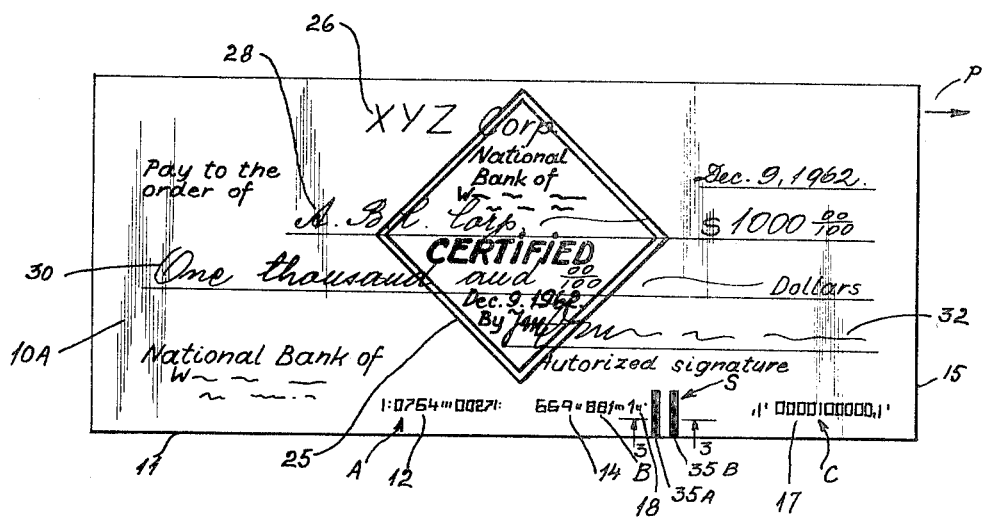
FIG. 2 is a plan view of a bank check after certification, according to the invention.
Figure 3:
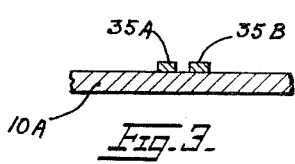
FIG. 3 is a setional view on an enlarged scale taken on line 3—3 of FIG. 2.

FIGS. 2 and 3 show a check 10A which has been certified by application of a certification stamp or marking 25 to the central portion of the face of the body of the check. This marking extends over part of the name of the drawer 26, part of the name of the payee 28, part of the written amount 30, and part of the authorized signature 32. Simultaneous with the application of the certification stamp, the same stamp stamps and applies with magnetic ink a pair of magnetic symbols 35A, 35B. These symbols are located in a space S between the "on us" and "amount" fields B, C, respectively. The symbols 35A, 35B extend above and below the top and bottom edges of the magnetic characters 12 and 14, respectively, and extend from the bottom edge 11 of the check. These symbols may be about 5/8 to 3/4 of an inch in length, and together extend about 5/8 of an inch in width.

When these symbols are encountered by the scanning mechanism as the check moves in the direction of arrow P shown in FIG. 2, the sorting machinery will automatically reject the check before it can be assigned to the account of the drawer whose account number is indicated by indicia such as numbers 14.

The most convenient way to apply the magnetic rejection symbols to the check is to provide a ribbon coated with magnetic ink in the certification stamping machine. This machine will include as part of its certification stamp the rejection symbols 35A, 35B.

By the means described, the bank and its customers are assured that once the amount of the check has been deducted from a customer's account at the time of certification of the check, the amount of the check will not be subsequently deducted again due to an error in electronic processing.

While a diamond-shaped stamp is illustrated it will be understood that a rectangular-shaped or circular shaped stamp might be used if desired.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new and desire to secure by United States Letters Patent is:

The method of certifying and marking a magnetically coded bank check so that it will be automatically rejected when passing through a magnetic reading and sorting machine, consisting of the step of impressing a certification stamp on the face of the check and simultaneously impressing, with the same stamp, in magnetic ink to which the electronic circuits of the machine are responsive, in an area responsive to the electronic circuits of the machine in relation to the coded symbols identifying the particular account against which the check is drawn, in the direction of movement of the check through the magnetic reading and sorting machine, coded symbols adapted to actuate the machine and automatically reject the check.

References Cited by the Examiner

UNITED STATES PATENTS

| | | | |
|---|---|---|---|
| 1,093,485 | 4/1914 | Scotford et al. | 101—111 |
| 1,721,104 | 7/1929 | Carlson et al. | 101—20 X |
| 1,985,035 | 12/1934 | Kermooe et al. | 101—2 X |
| 2,195,845 | 4/1940 | Wilson | 235—61.114 |
| 2,224,646 | 12/1940 | Friedman et al. | 235—61 |
| 2,254,933 | 9/1941 | Bryce | 235—61.114 |
| 2,520,077 | 8/1950 | Wolowitz | 101—369 |
| 2,788,879 | 4/1957 | Rand | 197—172 X |
| 3,029,920 | 4/1962 | Seifried | 197—6.6 |
| 3,039,682 | 6/1962 | Edminster et al. | 235—61.114 |
| 3,043,506 | 7/1962 | Bremer | 235—61.12 |
| 3,052,564 | 9/1962 | Kulesza | 235—61.12 |
| 3,064,560 | 11/1962 | Perry et al. | 101—269 X |
| 3,108,824 | 10/1963 | Fischer et al. | 283—58 X |

ROBERT E. PULFREY, *Primary Examiner.*

WILLIAM B. PENN, *Examiner.*

P. R. WOODS, *Assistant Examiner.*